(12) United States Patent
Kim et al.

(10) Patent No.: US 8,104,945 B2
(45) Date of Patent: Jan. 31, 2012

(54) BACKLIGHT UNIT IMPLEMENTING LOCAL DIMMING FOR LIQUID CRYSTAL DISPLAY DEVICE

(75) Inventors: Dae Hyun Kim, Ulsan (KR); Hun Joo Hahm, Gyunggi-do (KR); Hyung Suk Kim, Gyunggi-do (KR); Dae Yeon Kim, Gyunggi-do (KR)

(73) Assignee: Samsung LED Co., Ltd., Suwon (KR)

( * ) Notice: Subject to any disclaimer, the term of this patent is extended or adjusted under 35 U.S.C. 154(b) by 158 days.

(21) Appl. No.: 12/169,468

(22) Filed: Jul. 8, 2008

(65) Prior Publication Data

US 2009/0168455 A1 Jul. 2, 2009

(30) Foreign Application Priority Data

Dec. 27, 2007 (KR) .................. 10-2007-0139197

(51) Int. Cl.
*F21V 7/05* (2006.01)
*F21V 23/00* (2006.01)
*F21V 8/00* (2006.01)
*G09G 3/36* (2006.01)

(52) U.S. Cl. ........ 362/631; 362/231; 362/612; 362/613; 345/102

(58) Field of Classification Search ........ 362/97.1–97.4, 362/561, 631, 613, 608, 612, 630, 555, 231, 362/602, 616, 295; 345/102
See application file for complete search history.

(56) References Cited

U.S. PATENT DOCUMENTS

| | | | | |
|---|---|---|---|---|
| 5,808,597 A | * | 9/1998 | Onitsuka et al. | 345/102 |
| 6,315,440 B1 | * | 11/2001 | Satoh | 362/561 |
| 6,827,456 B2 | | 12/2004 | Parker et al. | |
| 6,828,954 B2 | * | 12/2004 | Yoshihara et al. | 345/102 |
| 6,885,360 B2 | * | 4/2005 | Hara et al. | 345/102 |
| 6,885,413 B2 | * | 4/2005 | Kang et al. | 349/73 |
| 6,988,813 B2 | * | 1/2006 | Hoelen et al. | 362/601 |
| 7,002,546 B1 | * | 2/2006 | Stuppi et al. | 345/102 |
| 7,018,060 B2 | | 3/2006 | Choi et al. | |
| 7,193,248 B2 | | 3/2007 | Weindorf et al. | |
| 7,234,854 B2 | * | 6/2007 | Masamoto | 362/612 |
| 7,248,244 B2 | * | 7/2007 | Akiyama | 345/102 |

(Continued)

FOREIGN PATENT DOCUMENTS

KR 10-2001-0039573 A 5/2001

(Continued)

OTHER PUBLICATIONS

Communication dated Jun. 28, 2010 in counterpart Korean Patent Application No. 10-2008-0134732.
Communication from the Korean Intellectual Property issued on Apr. 25, 2011 in counterpart Korean Patent Application No. 10-2011-0027459.

*Primary Examiner* — Alan Cariaso
(74) *Attorney, Agent, or Firm* — Sughrue Mion, PLLC

(57) ABSTRACT

A backlight unit for a liquid crystal display (LCD) device, disposed under a liquid crystal panel to illuminate the liquid crystal panel. The backlight unit includes a light guide plate, first and second light emitting diode (LED) arrays, disposed on adjacent sides, perpendicular to each other, of the light guide plate, each array having a plurality of LED blocks, consisting of one or more LEDs, and a control unit that controls electric signals, respectively inputted to the LED blocks, to regulate luminance for the respective LED blocks, wherein light emitted from the first and second LED arrays is overlapped each other in the light guide plate.

20 Claims, 9 Drawing Sheets

U.S. PATENT DOCUMENTS

| | | | |
|---|---|---|---|
| 7,413,330 B2 * | 8/2008 | Furukawa | 362/613 |
| 7,448,775 B2 | 11/2008 | Parker et al. | |
| 7,460,196 B2 | 12/2008 | Kim et al. | |
| 7,492,345 B2 * | 2/2009 | Jin et al. | 345/102 |
| 7,497,599 B2 | 3/2009 | Parker et al. | |
| 7,515,223 B2 * | 4/2009 | Lee et al. | 345/102 |
| 7,750,821 B1 * | 7/2010 | Taborisskiy et al. | 345/102 |
| 2002/0175632 A1 * | 11/2002 | Takeguchi | 315/169.1 |
| 2005/0146652 A1 * | 7/2005 | Yokoyama et al. | 349/61 |
| 2005/0185113 A1 * | 8/2005 | Weindorf et al. | 349/71 |
| 2007/0274095 A1 * | 11/2007 | Destain | 362/609 |
| 2009/0059130 A1 | 3/2009 | Kim et al. | |

FOREIGN PATENT DOCUMENTS

| | | |
|---|---|---|
| KR | 10-2006-0114545 A | 5/2001 |
| KR | 10-2004-029230 A | 4/2004 |
| KR | 10-2004-0103285 A | 12/2004 |
| KR | 10-2005-0044695 A | 5/2005 |
| KR | 10-2005-0112661 A | 12/2005 |
| WO | WO 2005/114273 A1 | 12/2005 |

* cited by examiner

|   | 1 | 0 |
|---|---|---|
| 0 | 1/2 | 0 |
| 1 | 1/2+1/2 | 1/2 |

FIG. 6A

|   | 1 | 0 | 1/2 |   |
|---|---|---|---|---|
| 0 | 1/3+1/6 | 1/6+1/6 | 1/6+1/6+1/3 | 0.5 |
| 1 | 1/3+1/3 | 1/3+1/6 | 1/3+1/6+1/3 | 0 |
| 1/2 | 1/3+1/6 | 1/6+1/6 | 1/3+1/6+1/6 | 0 |
|   | 0 | 1/2 | 1 |   |

FIG. 6B

BACKLIGHT UNIT IMPLEMENTING LOCAL DIMMING FOR LIQUID CRYSTAL DISPLAY DEVICE

CROSS-REFERENCE TO RELATED APPLICATIONS

This application claims the priority of Korean Patent Application No. 2007-0139197, filed on Dec. 27, 2007, in the Korean Intellectual Property Office, the disclosure of which is incorporated herein by reference.

BACKGROUND OF THE INVENTION

1. Field of the Invention

The present invention relates to a backlight unit for liquid crystal display devices using a light emitting diode (LED) and a light guide plate and, more particularly, to a backlight unit for liquid crystal display devices, which can implement local dimming using an edge light source.

2. Description of the Related Art

According to the recent trend of making an image display device have a slim size and high performance, a liquid crystal display (LCD) device has been widely used in a TV, a monitor, and others. Since a liquid crystal panel cannot emit light by itself, the LCD device needs an LCD backlight unit (hereinafter referred to as 'a backlight unit'). A cold cathode fluorescent lamp (CCFL) has been used as a light source of the backlight unit since it is cheap and is easily assembled.

However, the backlight unit using the CCFL has some defects. For example, it is difficult to implement partial driving such as local dimming or impulsive driving; the use of mercury creates environmental pollution; response rate is slow. To solve these problems, a backlight unit using, as a light source, LEDs instead of a CCFL was proposed.

In an LCD device, it is possible to regulate the luminance of a light source of a backlight unit in such a way that a liquid crystal panel is divided into a plurality of areas, and the luminance is regulated for the respective divided areas according to their gray levels. This driving manner of the backlight unit is called local dimming. That is, the LEDs on the region of the backlight unit corresponding to the bright portion of the liquid crystal panel may be partially turned on, and the others on the rest of the region of the liquid crystal panel may be turned on in low luminance, or otherwise turned off. The impulsive driving manner is one that the backlight unit is timely synchronized with the liquid crystal panel. According to the impulsive driving manner, a plurality of light source regions, arranged on the upper and lower sides of a board of the backlight unit, is turned on in series.

Generally, a backlight unit is divided into a direct backlight unit (direct illumination type) and an edge backlight unit (side illumination type). The edge backlight unit has a bar-type light source, which is disposed on a side of a liquid crystal panel so as to emit light toward the panel via a light guide plate, whereas the direct type backlight unit has a planar light source, which is positioned under a liquid crystal panel to directly illuminate the liquid crystal panel.

FIG. 1 is a perspective view illustrating a conventional edge type backlight unit using LEDs. The backlight unit 10 includes a light guide plate 11, an LED light source section 15, 17 disposed on opposite sides of the light guide plate, and a reflector sheet 19 underlying the light guide plate 11. The LED light source section 15 and 17 has a printed circuit board (PCB) 17 and a plurality of LEDs 15 arranged on the board 17. Light emitted from the LEDs 15 to the light guide plate 11 travels the light guide plate 11 through total internal reflection and is transferred to a liquid crystal panel through light scattering. Such an edge type backlight unit 10 is advantageously fabricated in a relatively small thickness, which however is not appropriate for a partial driving manner, such as local dimming, or so on.

FIG. 2 is a perspective view illustrating a conventional direct type backlight unit using LEDs. In FIG. 2, the backlight unit 20 includes a PCB 21 and a plurality of LEDs 23 thereon. A diffuser plate 25 for diffusing light is disposed between a liquid crystal panel (not shown) and the LEDs 23. The LEDs 23 directly emit light toward a front face of the liquid crystal panel. Such a direct type backlight unit 20 can implement a partial driving manner, such as local dimming or so on. As a method applicable to the local dimming, there are two methods in which one is to control the respective LEDs 23, turning on/off the same, and the other is to divide the backlight unit into uniform regions (e.g., regions A1, A2, and A3), driving the LEDs for the respective regions. However, in the case of individually driving the respective LEDs 23, a problem arises in high power consumption, high cost for protection against high temperature, complexity of a circuit, or others. In the case of driving for the respective regions, a problem occurs in that local dimming effect is relatively deteriorated due to the difficulty in fine division into regions and also a thickness H of the backlight unit. Particularly, since a sufficient thickness H corresponding to an optical thickness is needed to secure uniformity of light, it is disadvantageous to make the backlight unit (and further the LCD device) thinner.

SUMMARY OF THE INVENTION

The present invention has been made to solve the foregoing problems with the prior art, and therefore the present invention provides an edge type backlight unit for a liquid crystal display device, advantageous for making a product thinner, and capable of implementing an effective local dimming.

According to an aspect of the present invention, there is provided a backlight unit for a liquid crystal display device, which is disposed under a liquid crystal panel to emit light toward the liquid crystal panel. The backlight unit includes a light guide plate; first and second light emitting diode (LED) arrays disposed on adjacent sides, perpendicular to each other, of the light guide plate, each of the arrays having a plurality of LED blocks, each of which consists of one or more LEDs; and a control unit that controls electric signals, respectively inputted to the LED blocks, to regulate luminance for the respective LED blocks, wherein light emitted from the first and second LED arrays overlaps in the light guide plate.

The light guide plate may have one or more shield structures therein for blocking light propagation.

The shield structure may be arranged horizontally and vertically to the light guide plate.

The shield structure may be a reflector film, or otherwise be a bent provided on a boundary between regions divided by the same.

The backlight unit may further include third and fourth LED arrays, respectively disposed opposite to the first and second LED arrays on the other adjacent sides, perpendicular to each other, of the light guide plate, and having the same construction as the first and second LED arrays.

The LED block may include a red LED, a green LED, and a blue LED for use in a dimmer used in an LCD TV or so on, or otherwise include a white LED.

The control unit may include an LED block driving controller and a panel image signal transmitter.

The panel image signal transmitter may include a panel data transfer circuit and a panel data combination circuit.

The backlight unit may further include a reflector sheet under the light guide plate.

The backlight unit may further include an optical sheet disposed on the light guide plate.

As set forth above, according to the present invention, the backlight unit for a liquid crystal display device is advantageous for making a product thinner, and is capable of implementing effective local dimming.

BRIEF DESCRIPTION OF THE DRAWINGS

The above and other aspects, features and other advantages of the present invention will be more clearly understood from the following detailed description taken in conjunction with the accompanying drawings, in which:

FIG. 6 is a view for explaining the principle of implementing local dimming through the backlight unit shown in FIG. 3;

DETAILED DESCRIPTION OF THE EXEMPLARY EMBODIMENTS

Preferred embodiments of the present invention will be described herein below with reference to the accompanying drawings. However, the embodiments of the invention may be changed into other diverse forms, and the present invention is not limited thereto. Furthermore, the embodiments are provided to those skilled in the art only for illustrative purpose. Throughout the drawings, the shapes, the sizes or so of the components may thus be exaggerated for more clear explanation, and like reference numbers are used to depict the same or similar elements, features and structures.

Figure 1:
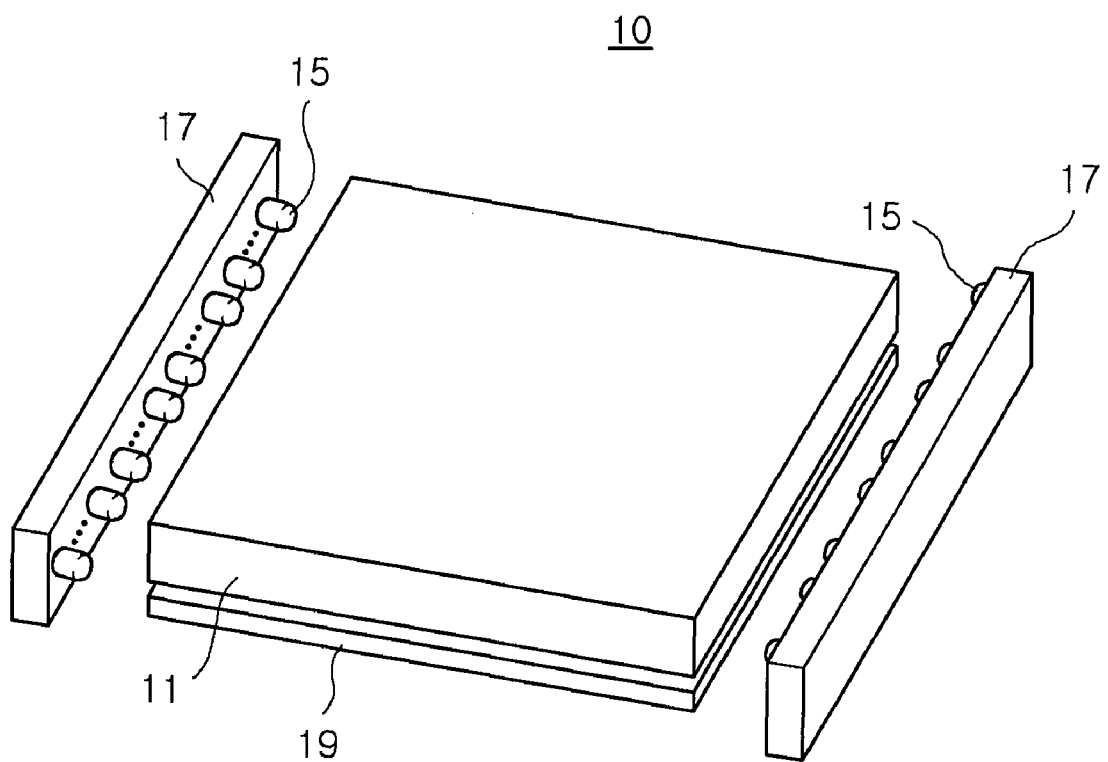
FIG. 1 is a perspective view illustrating a conventional edge type backlight unit.
Figure 2:
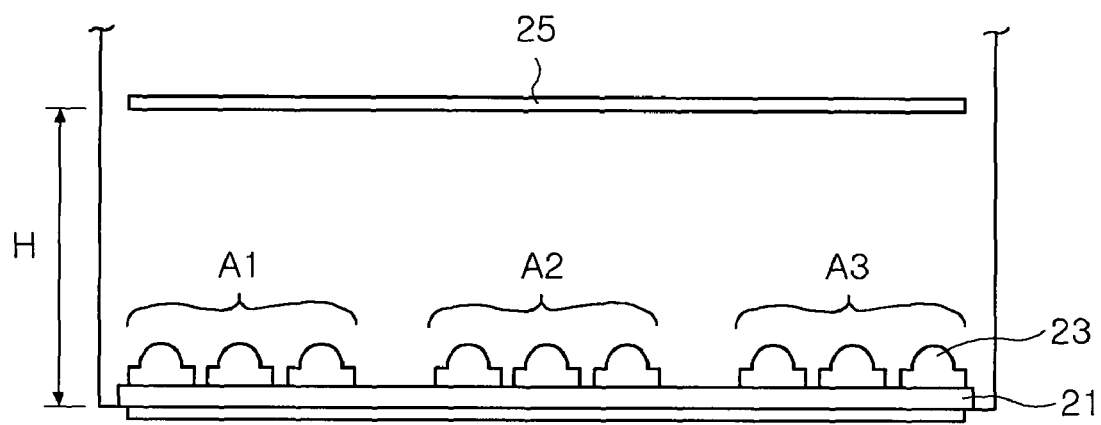
FIG. 2 is a sectional view illustrating a conventional direct type backlight unit.
Figure 3:
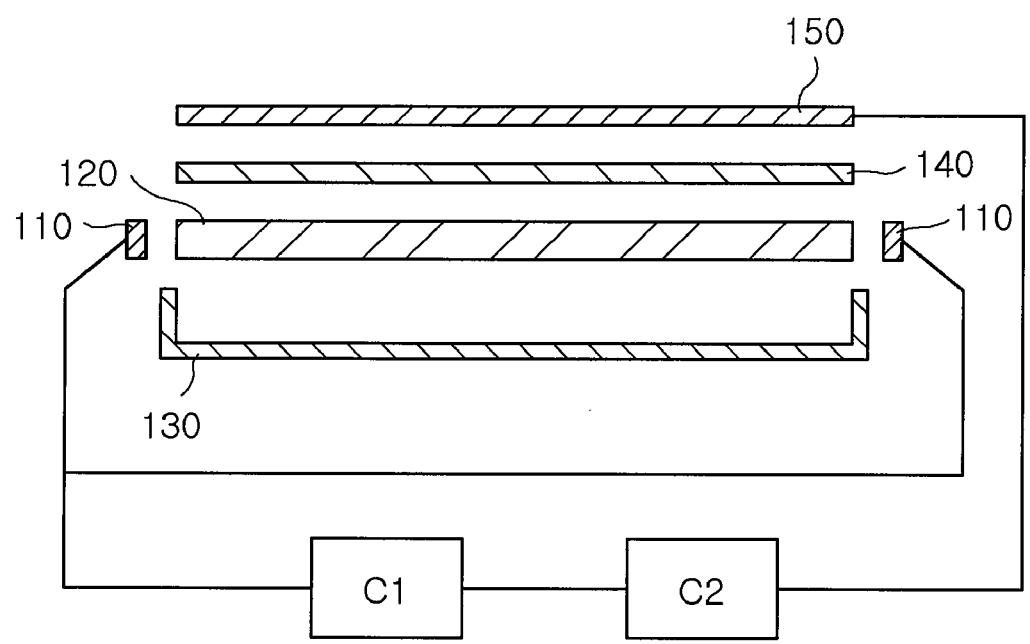
FIG. 3 is a sectional view illustrating a backlight unit according to an embodiment of the present invention, wherein respective components thereof are shown in exploded form.
Figure 4:
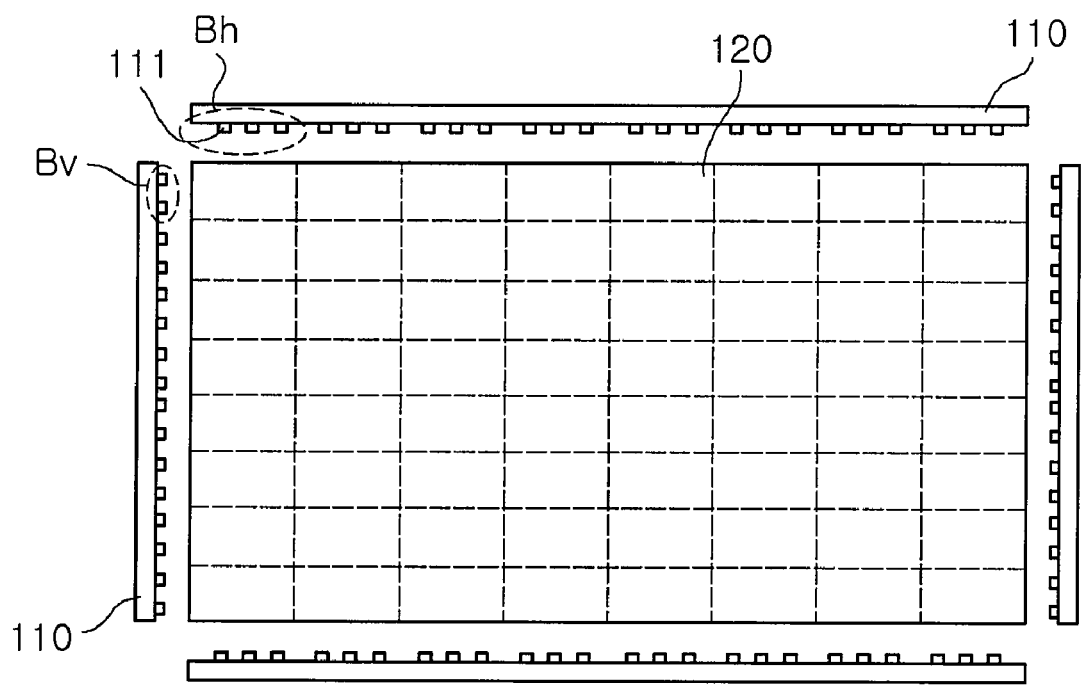
FIG. 4 is a plan view illustrating a light guide plate and an LED array shown in FIG. 3.
Figure 5:
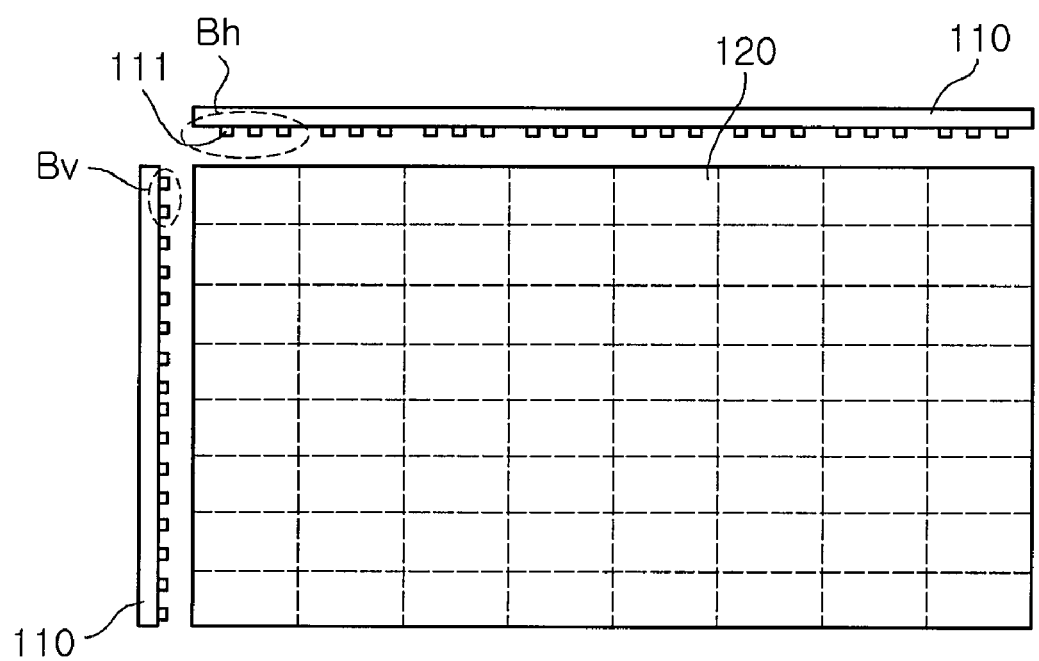
FIG. 5 is a plan view illustrating a light guide plate and an LED array modified from the embodiment shown in FIG. 4.

FIG. 3 is a sectional view illustrating a backlight unit according to an embodiment of the present invention, wherein respective components thereof are shown in exploded form, FIG. 4 is a plan view illustrating a light guide plate and an LED array shown in FIG. 3, and FIG. 5 is a plan view illustrating a light guide plate and an LED array modified from the embodiment shown in FIG. 4.

Referring first to FIG. 3, the backlight unit according to the present embodiment illuminates a liquid crystal panel 150 disposed above there, and includes a plurality of LED arrays 110, a light guide plate 120, a lower chassis 130, an optical sheet 140, and a control unit C1, C2. The control unit includes an LED block driving controller C1 and a panel image signal transmitter C2, which will be described in detail with respect to FIG. 7.

The lower chassis 130 is generally made from a metallic material for the purpose of heat dissipation, and contains therein the other elements constituting the backlight unit, such as the light guide plate 120, a PCB, surface-mounted thereon with LED chips, and others.

The light guide plate 120 is composed of a transparent material so as to allow light emitted from the LED arrays 110 to pass through, and generally is of a hexahedron in structure, which however is not restricted thereto. The light guide plate 120 serves to uniformly distribute light inputted from a side direction thereof to maintain luminance and uniformity of color in the liquid crystal panel 150, and also enables input light to move forward straight.

Though it is not an essential element of the present invention, an optical sheet 140 may be laminated on the light guide plate 120 so as to improve the luminance. The optical sheet includes any of a diffusion sheet, which diffuses light in directions toward the liquid crystal panel 150, and a prism sheet, which collects light within a front viewing-angle.

Meanwhile, as is not shown in the drawing, if needed, a reflector sheet may be further arranged on the light guide plate 120 and the lower chassis 120.

An arrangement of the light guide plate 120 and the LED arrays 110 will now be explained with reference to FIG. 4. The LED array 110 has a plurality of LED blocks Bh and Bv, and is arranged on four sides of the light guide plate 120, respectively.

In this case, light emitted from two adjacent LED arrays 110, arranged perpendicular to each other, among four LED arrays 110, arranged on the four sides of the light guide plate 120, may be overlapped each other after incident to the light guide plate 120. In the present embodiment, since the LED array 110 is divided into LED blocks Bh and Bv, so that the luminance thereof is regulated for its respective blocks, it is understood that as depicted with dotted line, the light guide plate is virtually divided into regions corresponding to the division of the blocks.

To be specific, each of the LED blocks Bh and Bv, included in the LED array 110, has one or more LED chips 111, and is regulated in brightness by different electric input signals, respectively. In the present embodiment, although the drawing indicates that the horizontal LED block Bh includes three LED chips and the vertical LED block Bv includes two LED chips, the present invention is not limited thereto, and the number of the LED chips included in the respective LED blocks can be properly selected as needed.

Meanwhile, since the LED chip 111 in the LED block Bh and Bv desirably emits white light so as to be used as a dimmer for an LCD TV or so, it can emit white light for itself through a combination with a fluorescent material. Alternatively, according to embodiments, the respective LED blocks Bh and Bv may also include a red-LED, a green-LED, and a blue-LED.

As set forth above, light emitted from the horizontal and vertical LED blocks Bh and Bv is overlapped each other, and the overlapped light then uniformly advances through the light guide plat 120.

Like this, as light from the horizontal and vertical LED blocks Bh and Bv is overlapped each other, the backlight unit according to the present embodiment can implement local dimming even though it is of an edge type.

This will be explained referring to FIG. 6. FIG. 6 is a view for explaining the principle of implementing local dimming through the backlight unit shown in FIG. 3.

First, in FIG. 6(a) where two LED arrays are respectively arranged horizontally and vertically, one LED array has two LED blocks. In this case, without taking account the number of the LED chips in the respective LED blocks, assuming that each LED block has two operation modes, wherein one mode 0 is not to substantially emit light, and the other mode 1 to emit light, and that light emitted from the LED block uniformly advances straight, the light guide plate is divided into four regions to thereby regulate the luminance thereof.

That is, for example, one of two horizontal LED blocks and one of two vertical LED blocks are light-emitted, so that relative luminance values of the four divided regions of the light guide plate show 1/2, 0, 1(1/2+1/2), 1/2, respectively.

More detailed example will be explained with reference to FIG. 6(b).

In FIG. 6(b), four LED arrays are two-by-two arrays arranged horizontally and vertically, each two arrays in the same direction being arranged on opposite sides of the light guide plate, and one LED array has three LED blocks. Differently from the case of FIG. 6(a), each LED block has three operation modes, wherein the first mode 0 is not to substantially emit light, the second mode 1 to emit light, and the third intermediate mode 1/2 to emit light to a degree of intermediate light-emission.

Accordingly, in the case where the light-emitting states of all the four LED arrays are like in FIG. 6(b), the light guide plate is divided into nine driving regions, and relative luminance values of the nine divided regions show 1/2(1/3+1/6), 1/3(1/6+1/6), 2/3(1/6+1/6+1/3), 2/3(1/3+1/3), 1/2(1/3+1/6), 5/6(1/3+1/6+1/3), 2/3(1/3+1/6), 1/3(1/6+1/6), and 2/3(1/3+1/6+1/6), respectively.

Like this, the backlight unit according to the present embodiment can individually regulate the luminance of the respective LED blocks, included in the LED arrays, arranged on the sides of the light guide plate, so that local dimming can be implemented. Particularly, the number of the divided regions to be driven is determined depending on the number of the LED blocks, and an adjustable luminance level can be diversely varied according to the number of cases of the light-emission and the number of the LED arrays (two or four). In this case, as the above numbers are larger, the local dimming can be regulated more accurately.

Therefore, apart from the formation shown in FIG. 4, it is possible to provide the formation shown in FIG. 5, in which only two LED arrays 110 are included perpendicular to each other on the adjacent sides of the light guide plate 120.

Meanwhile, beside the above case of the present embodiment where the number of the divided regions is the same in horizontal and vertical directions (a rectangular square), respectively, the divided driving regions for local dimming may of course have the different number (a rectangle).

Further, though it is changed according to embodiments, in the case that the liquid crystal panel has the size of 40", 64 (8×8) divided driving regions are most preferable. Further, it is preferable that 46" be of 80 (10×8), and 52" of 96 (12×8).

As set forth before, the backlight unit according to the present embodiment is characterized in that the luminance is regulated for the respective LED blocks. This regulation can be implemented by regulating electric signals input to the LED blocks. This will be described with reference to FIG. 7.

Figure 7:
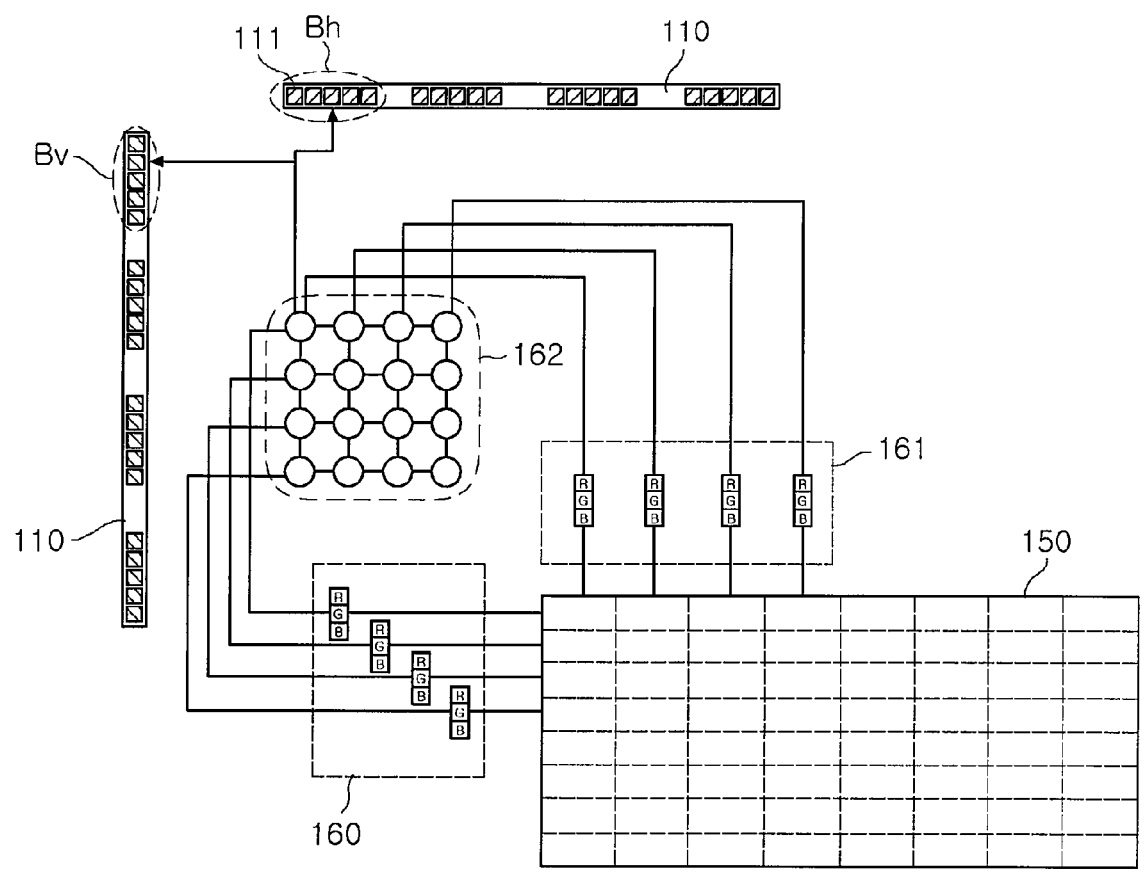
FIG. 7 is a schematic diagram illustrating a control unit of the backlight unit shown in FIG. 3 for regulating luminance of the respective LED blocks.

FIG. 7 is a schematic diagram illustrating the control unit of the backlight unit shown in FIG. 3 for regulating luminance of the respective LED blocks.

First, the panel image signal transmitter (denoted as C2 in FIG. 3) includes a panel data transfer circuit 160 and 161 and a panel data combination circuit 162. The panel data transfer circuit 160 and 161 receives image signals for each divided driving region form the liquid crystal panel 150. In this case, the panel image signal transmitter includes a longitudinal-axis controller 160 and a transversal-axis controller 161, and the image signals received correspond to an opening ratio (a variation in slope of a liquid crystal) and driving signals for R, G, and B colors according to an electric signal applied to the liquid crystal panel.

The image signals are collected to the panel data combination circuit 162 in a matrix form relative to the transversal and longitudinal axes, and then determine output power of the respective LED blocks Bh and Bv, as indicated as an arrow in FIG. 6 (which is shown in horizontal and vertical LED blocks only one by one), via the LED block driving controller (not shown, and denoted as C1 in FIG. 3).

In this case, the whole circuit construction of the panel image signal transmitter and the LED block driving controller, both constituting the control unit, may be a known circuit construction connecting the liquid crystal panel and the LEDs.

Meanwhile, while FIG. 7 illustrates the control operation for the driving regions divided 4 by 4 in horizontal and vertical directions, respectively, i.e., total 16 LED blocks Bh and Bv for convenience in explanation, it is true that in order to control the whole of the divided driving regions, the transmitter and the combination circuit should have the corresponding numbers.

Figure 8:
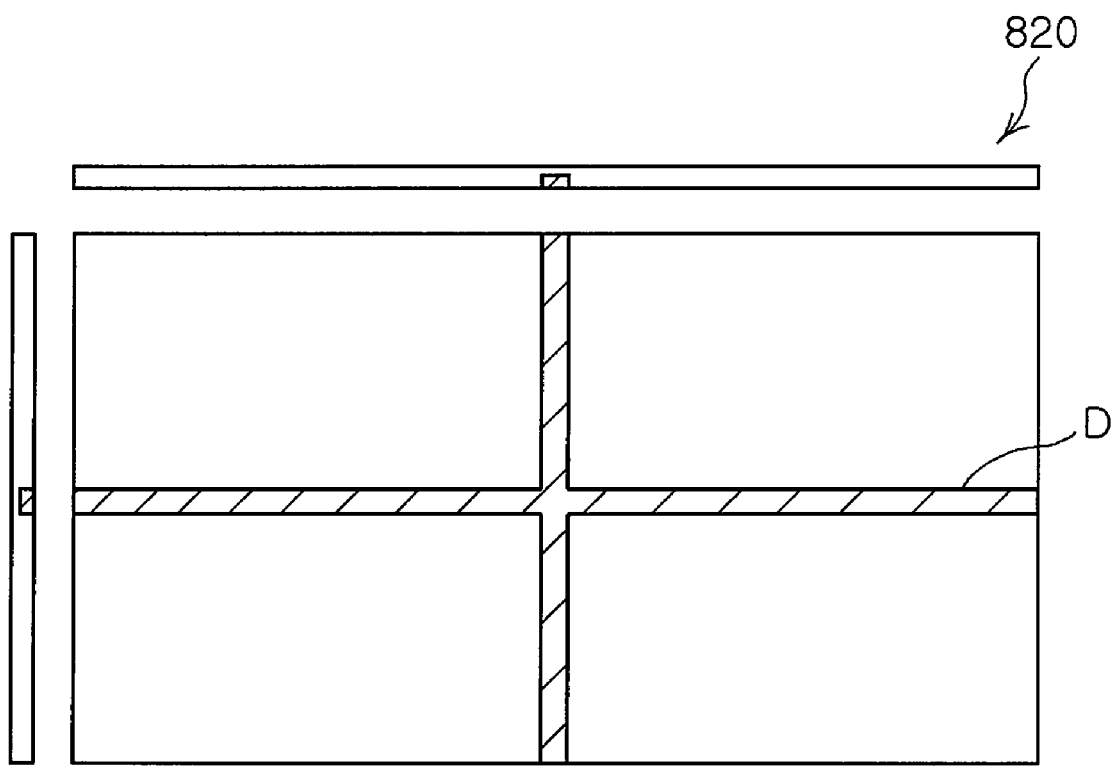
FIG. 8 is a plan view illustrating a light guide plate that is applicable to another embodiment of the present invention.
Figure 9:
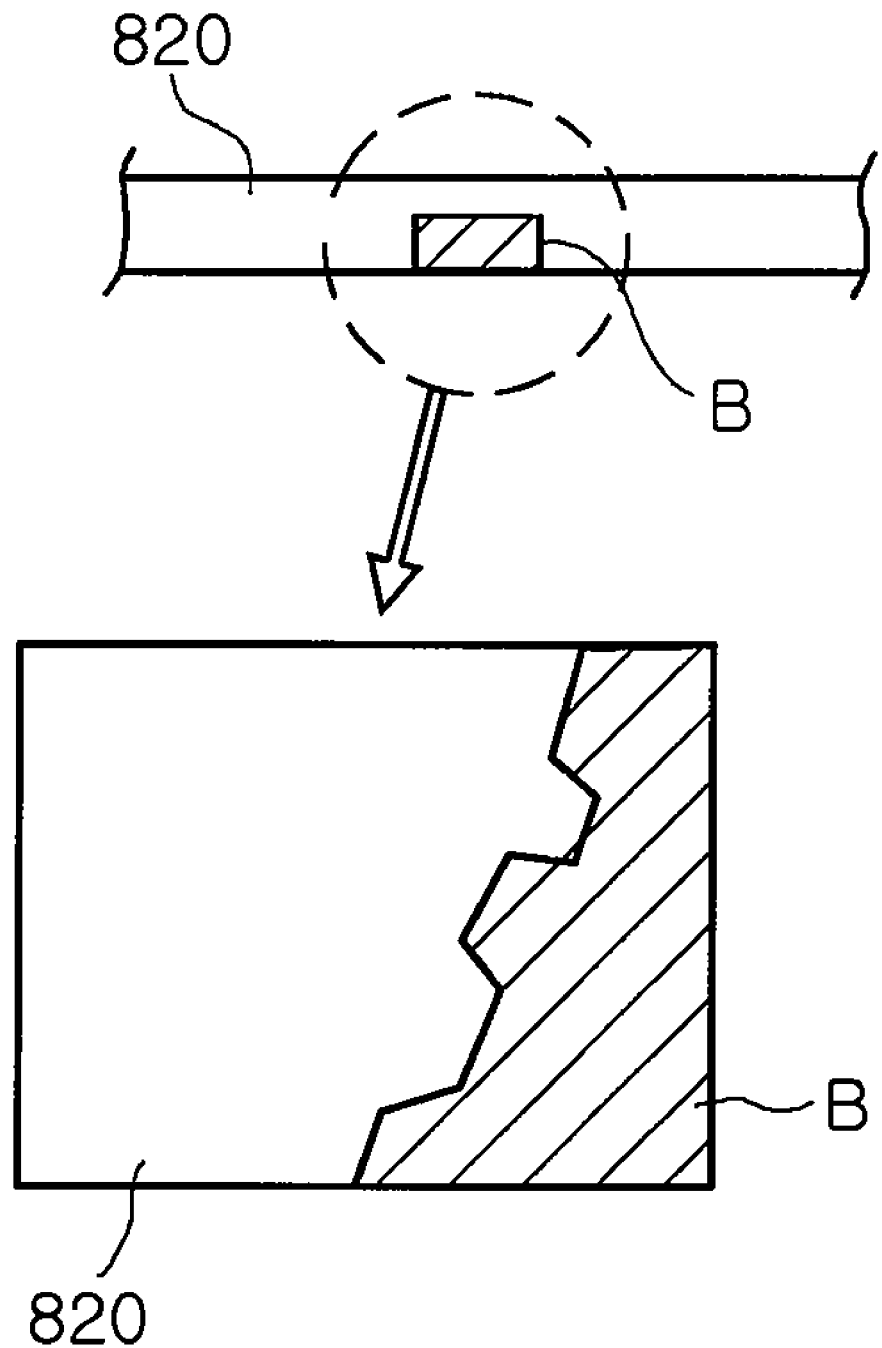
FIG. 9 is a view illustrating an embodiment of the light guide plate shown in FIG. 8.

FIG. 8 is a plan view illustrating a light guide plate that is applicable to another embodiment of the present invention, and FIG. 9 is a view illustrating an embodiment of the light guide plate shown in FIG. 8.

As shown in FIG. 8, the light guide plate 820 has four regions that are optically distinguishable from each other. These correspond to the optically (physically) divided regions, which are different from those virtually divided driving regions of the light guide plate as shown in FIG. 3.

Like this, the light guide plate 820 is divided into four regions by a shield structure D, which is arranged horizontally and vertically in the light guide plate to thereby block the light propagation. Thus, the respective regions of the light guide plate 820 divided by the shield structure D can be individually driven without relative interference, and with the combination of individual control for the respective LED blocks, described before, it is possible to implement local dimming more efficiently.

Meanwhile, according to another embodiment, the shield structure may be a reflection structure composed of high reflective material, or otherwise be a bent B, which is formed by bending the boundary between the divided regions as shown in FIG. 9.

As set forth before, the backlight unit according to the embodiments of the invention provides the effect that unlikely the conventional direct type backlight unit, there is no need to make the thickness thick (that is, according to the present invention, light is transferred to the liquid crystal panel using the light guide plate), so that the thickness can be made thinner and also a partial driving is possible. Thus, the effects from the partial driving (e.g., improvements in contrast ratio, image quality or so by local dimming) are sufficiently obtained, and it is advantageous to making a product have a slim size.

While the present invention has been shown and described in connection with the exemplary embodiments, it will be apparent to those skilled in the art that modifications and variations can be made without departing from the spirit and scope of the invention as defined by the appended claims.

What is claimed is:

1. A backlight unit for a liquid crystal display (LCD) device, disposed under a liquid crystal panel to illuminate the liquid crystal panel, the backlight unit comprising:

a light guide plate;
first and second light emitting diode (LED) arrays disposed on adjacent sides, perpendicular to each other, of the light guide plate, each of the arrays having at least one of LED blocks, each of which consists of one or more LEDs; and
a control unit that controls electric signals, respectively inputted to the LED blocks, to regulate luminance for the respective LED blocks,
wherein light emitted from the first and second LED arrays overlaps in the light guide plate, and
wherein the control unit controls an electric signal to regulate a luminance of a first LED block of the LED blocks independently of an electric signal to regulate a luminance of a second LED block of the LED blocks.

2. The backlight unit for LCD device of claim 1, wherein the light guide plate has one or more shield structures therein for blocking light propagation.

3. The backlight unit for LCD device of claim 2, wherein the shield structure is arranged in horizontal and vertical directions with respect to the light guide plate.

4. The backlight unit for LCD device of claim 2, wherein the shield structure is a reflector film.

5. The backlight unit for LCD device of claim 2, wherein the shield structure is a bent provided on a boundary between regions divided by the same.

6. The backlight unit for LCD device of claim 1, further comprising third and fourth LED arrays, respectively disposed opposite to the first and second LED arrays on the other adjacent sides, perpendicular to each other, of the light guide plate, and having the same construction as the first and second LED arrays.

7. The backlight unit for LCD device of claim 1, wherein the LED block includes a red LED, a green LED, and a blue LED.

8. The backlight unit for LCD device of claim 1, wherein the LED block includes a white LED.

9. The backlight unit for LCD device of claim 1, wherein the control unit includes an LED block driving controller and a panel image signal transmitter.

10. The backlight unit for LCD device of claim 9, wherein the panel image signal transmitter includes a panel data transfer circuit and a panel data combination circuit.

11. The backlight unit for LCD device of claim 1, further comprising a reflector sheet under the light guide plate.

12. The backlight unit for LCD device of claim 1, further comprising an optical sheet disposed on the light guide plate.

13. The backlight unit for LCD device of claim 1, wherein the control unit receives a first image signal for a first region of the liquid crystal panel and a second image signal for a second region of the liquid crystal panel, and determines an output power of the first LED block according to the first image signal and an output power of the second LED block according to the second image signal.

14. A display device comprising:
a display panel; and
a backlight unit which irradiates light to the display panel, wherein the backlight unit comprises:
a light guide plate;
first and second light emitting diode (LED) arrays disposed on adjacent sides, perpendicular to each other, of the light guide plate, each of the arrays having at least one of LED blocks, each of which consists of one or more LEDs; and
a control unit that controls electric signals, respectively inputted to the LED blocks, to regulate luminance for the respective LED blocks,
wherein light emitted from the first and second LED arrays overlaps in the light guide plate, and
wherein the control unit controls an electric signal to regulate a luminance of a first LED block of the LED blocks independently of an electric signal to regulate a luminance of a second LED block of the LED blocks.

15. The display device of claim 14, wherein the display panel is a liquid crystal panel.

16. The display device of claim 14 further comprising a driving circuit which drives the backlight unit.

17. A television comprising:
a display panel; and
a backlight unit which irradiates light to the display panel, wherein the backlight unit comprises:
a light guide plate;
first and second light emitting diode (LED) arrays disposed on adjacent sides, perpendicular to each other, of the light guide plate, each of the arrays having at least one of LED blocks, each of which consists of one or more LEDs; and
a control unit that controls electric signals, respectively inputted to the LED blocks, to regulate luminance for the respective LED blocks,
wherein light emitted from the first and second LED arrays overlaps in the light guide plate, and
wherein the control unit controls an electric signal to regulate a luminance of a first LED block of the LED blocks independently of an electric signal to regulate a luminance of a second LED block of the LED blocks.

18. The television of claim 17, wherein the display panel is a liquid crystal panel.

19. The television of claim 17 further comprising a driving circuit which drives the backlight unit.

20. The backlight unit for LCD device of claim 1, wherein the first LED block is of the first LED array and the second LED block is of the second LED array, and light emitted from the first LED block overlaps with light emitted from the second LED block.

* * * * *